Oct. 31, 1933. R. ENGELHARDT 1,933,422
CHLORINATION OF NAPHTHALENE
Filed Dec. 17, 1930
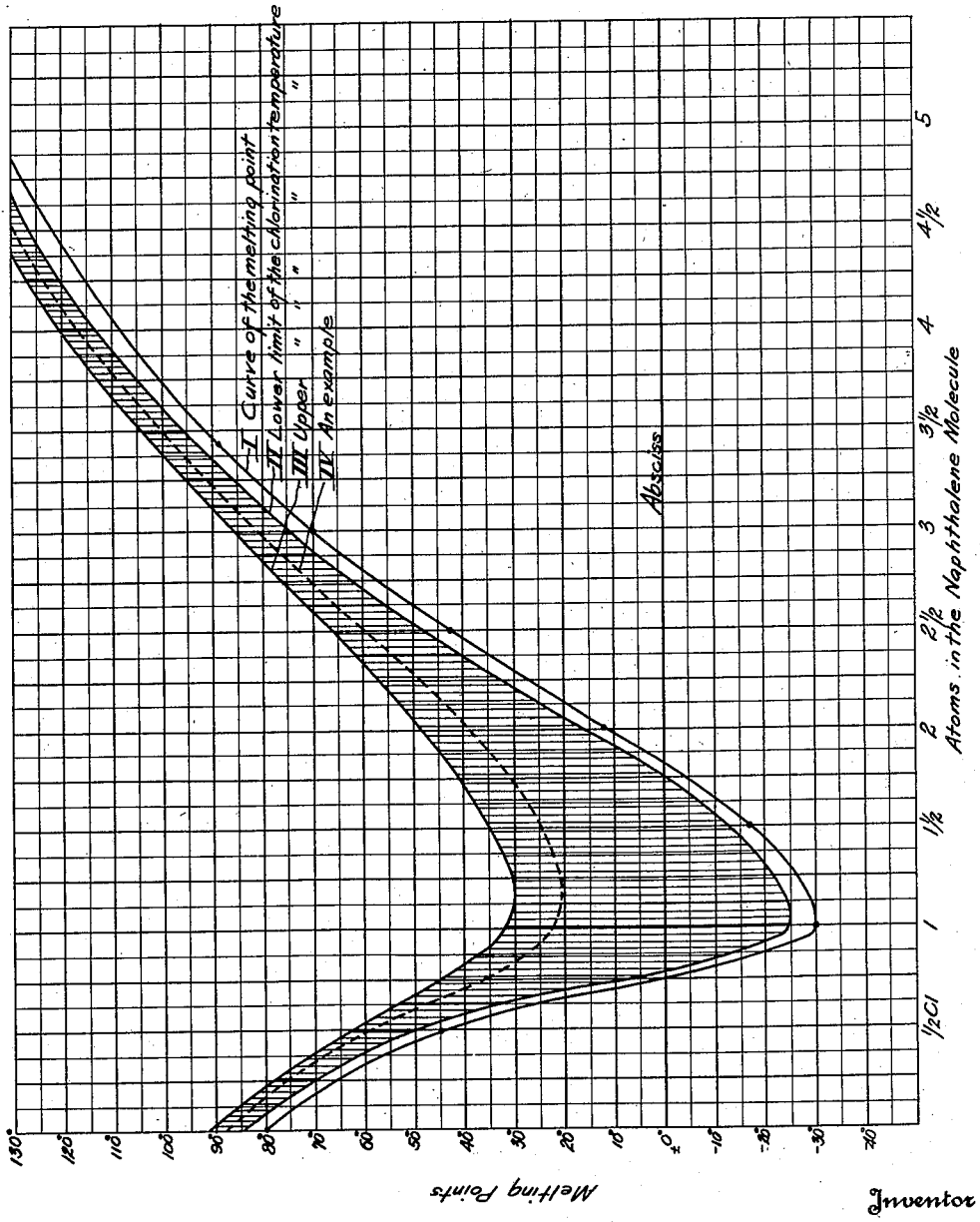
Inventor:
Rudolf Engelhardt,
By Byrne Townsend & Potter,
Attorneys.

Patented Oct. 31, 1933

1,933,422

UNITED STATES PATENT OFFICE 1,933,422

CHLORINATION OF NAPHTHALENE

Rudolf Engelhardt, Leverkusen-on-the-Rhine, Germany, assignor to I. G. Farbenindustrie Aktiengesellschaft, Frankfort - on - the - Main, Germany Application December 17, 1930
Serial No. 503,031

3 Claims. (Cl. 260—161)

The present invention relates to the manufacture of chlorinated naphthalene of a wax-like nature.

In accordance with the present invention, valuable masses of a wax-like nature of a chlorine content between about 46 and 60%, that is to say, between about 3 and 5 chlorine atoms in the naphthalene molecule, are prepared by starting the chlorination process at a temperature of about 5 to about 10° C. above the melting point of naphthalene, then gradually lowering the temperature down to at least 30° C., simultaneously introducing chlorine into the melt, which temperature of 30° C. is to be reached when about 1 chlorine atom has entered the naphthalene molecule. Then again the temperature is slowly raised, while continuing the passing in of chlorine in such a manner that at about at most 50° C. 2 chlorine atoms have entered the naphthalene molecule, at about 65° C. 2½ chlorine atoms, and completing the chlorination at a temperature of about 5 to 10° C. above the melting point of the reaction mixture. The chlorination is interrupted as soon as a cooled test portion shows the desired wax-like consistency; that is, when about 3 to 5 chlorine atoms have entered the naphthalene nucleus, the whole chlorination process thus being performed at temperatures below 130° C.

In the annexed diagram curve I indicates the melting points of chlorinated naphthalene, curve II indicates the lower limit of the chlorination temperature, said curve indicating a range of temperatures 5° C. above the melting point of the chlorination product at any stage of chlorination, while curve III is a temperature curve indicating the upper limit which is not to be exceeded at the specific chlorine content stated on the absciss of the diagram. It shall be mentioned that theoretically the whole chlorination process should be performed at temperatures about 5 to about 10° C. above the melting point of the reaction mass, but as is to be seen from the curve of the melting points, when working in this manner a cooling down to about minus 25° C. would be necessary which would render the process cumbersome. We therefore prefer to use a lower limit of about +30° C. The whole range of temperatures being taken into consideration for the purpose of the invention is to be seen from the annexed diagram, the hatched area covering said interval of temperatures.

Furthermore, I have found that my new process may be carried out in the presence of a chlorination catalyst of the group consisting of antimony, phosphorus, sulfur, iodine, and advantageously their chlorine compounds, such as antimony trichloride, ferric chloride and the like.

The present application is a continuation-in-part of my application Serial No. 387,555.

The following example will illustrate my invention without limiting it thereto:

*Example.*—20 parts of antimony trichloride are added to 2000 parts of naphthalene, well mixed and the mass is fused. In the course of 10 hours 4400 parts of chlorine are led in, the temperature being kept along the broken line of curve IV of the annexed drawing. Air is then forced through the melt for some time after which it can be used directly or distilled under reduced pressure.

I claim:

1. The process of chlorinating naphthalene which comprises continuously introducing chlorine into the molten reaction mass, maintaining the temperature between about 5 to about 10° C. above the melting point in each stage of the chlorination and a temperature indicated by a curve which follows the same general slope of the melting point curve and which gradually increases from 10° C. above the melting point curve at 80° C. to 60° C. above the melting point curve at −30° C. when one chlorine atom has entered the molecule and which gradually decreases again to about 22° C. above the melting point curve at about 40° C. when 2½ chlorine atoms have entered the molecule and to at the most 15° C. above the melting point curve at a temperature of at least 70° C. when at least 3 chlorine atoms have entered the molecule, until a test portion shows, when cooled, the consistency of a wax.

2. A process as claimed in claim 1, in which the chlorination is performed with the addition of a catalyst of the group consisting of antimony, phosphorus, sulfur, iodine and their chlorine compounds.

3. A process as claimed in claim 1, in which the chlorination is performed with the addition of antimony trichloride as catalyst.

RUDOLF ENGELHARDT.